(12) United States Patent
Hoerder (10) Patent No.: US 11,500,986 B2
(45) Date of Patent: Nov. 15, 2022

(54) SIDE-CHANNEL ATTACK PROTECTED GATES HAVING LOW-LATENCY AND REDUCED COMPLEXITY

(71) Applicant: Rambus Inc., San Jose, CA (US)

(72) Inventor: Simon Hoerder, Eindhoven (NL)

(73) Assignee: Cryptography Research, Inc., San Jose, CA (US)

( * ) Notice: Subject to any disclaimer, the term of this patent is extended or adjusted under 35 U.S.C. 154(b) by 60 days.

(21) Appl. No.: 17/028,831

(22) Filed: Sep. 22, 2020

(65) Prior Publication Data

US 2021/0097175 A1 Apr. 1, 2021

(30) Foreign Application Priority Data

Sep. 26, 2019 (EP) ..................................... 19199955

(51) Int. Cl.
*G06F 21/55* (2013.01)

(52) U.S. Cl.
CPC ...... *G06F 21/556* (2013.01); *G06F 2221/034* (2013.01)

(58) Field of Classification Search
CPC . H04L 2209/046; H04L 9/0625; H04L 9/002; G06F 21/755; G06F 21/556
See application file for complete search history.

(56) References Cited

U.S. PATENT DOCUMENTS

| 2006/0200514 | A1 | 9/2006 | Fischer et al. | |
|---|---|---|---|---|
| 2008/0005476 | A1* | 1/2008 | Venkatesan | G06F 12/1416 |
| | | | | 711/E12.098 |
| 2009/0116644 | A1* | 5/2009 | Klimov | H04L 9/0625 |
| | | | | 380/252 |

FOREIGN PATENT DOCUMENTS

EP 2063376 A1 5/2009

OTHER PUBLICATIONS

Hannes et al, Generic low-latency masking in hardware, 2018, Institute for Applied Information Processing and Communications, Graz University of Technology, ALL. (Year: 2018).*
Hannes et al, Domain-Oriented Masking: Compact Masked Hardware Implementations with Arbitrary Protection Order, Oct. 2016, Institute for Applied Information Processing and Communications (IAIK), Graz University of Technology all pages (Year: 2016).*
Hannes et al, Domain-Oriented Masking: Compact Masked Hardware Implementations with Arbitrary Protection Order, Nov. 15, 2016, Cryptology e-print archive, pp. 22-25 (Year: 2016).*

(Continued)

*Primary Examiner* — Ashokkumar B Patel
*Assistant Examiner* — William B Jones
(74) *Attorney, Agent, or Firm* — Lowenstein Sandler LLP (57) ABSTRACT

A masked logic gate protected against side-channel attacks using Boolean masking with d+1 shares for each input variable, where d is an integer at least equal to 1 representing the protection order is described. The masked logic gate includes a first input configured to receive a number of shares $y_j$ ($j=0, 1, 2 \ldots$); a second input configured to receive $(d+1)^2$ shares $x_i$ ($i=0, 1, 2 \ldots$) representative of an intermediate result output by one layer of a tree of gates implementing low-latency masking with a protection order of d; and a (d+1)-share output obtained by applying a logic function of the masked logic gate to the shares of the first and second inputs using domain-oriented masking.

16 Claims, 8 Drawing Sheets

(56) References Cited

OTHER PUBLICATIONS

Hannes et al, Generic low-latency masking in hardware, May 8, 2018, Institute for Applied Information Processing and Communications (IAIK), Graz University of Technology, all (Year: 2018).*

EP Extended European Search Report dated Mar. 20, 2020 re: EP Appln. No. 19199955.6, 6 pages.

Gross, Hannes et al., "Generic Low-Latency Masking in Hardware", IACR, International Association for Cryptologic Research, vol. 20180409:065628, Apr. 9, 2018, pp. 1-21, Retrieved from the Internet, URL:http://eprint.iacr.org/2017/1223.pdf, Retrieved on Apr. 9, 2018, 21 pages.

* cited by examiner

AND22_M2

AND22_M4

|   | y0 | y1 | y2 | y3 | y4 | y5 | y6 | y7 | y8 |
|---|---|---|---|---|---|---|---|---|---|
| x0 | r0 | r3 | r10 | r1 | r4 | r11 | r2 | r5 |  |
| x1 | r0 | r4 | r9 | r1 | r5 |  | r2 | r3 | r10 |
| x2 | r0 | r5 |  | r1 | r3 | r9 | r2 | r4 | r11 |
| x3 | r3 | r6 | r10 | r4 | r7 | r11 | r5 | r8 |  |
| x4 | r3 | r7 | r9 | r4 | r8 |  | r5 | r6 | r10 |
| x5 | r3 | r8 |  | r4 | r6 | r9 | r5 | r7 | r11 |
| x6 | r6 | r0 | r10 | r7 | r1 | r11 | r8 | r2 |  |
| x7 | r6 | r1 | r9 | r7 | r2 |  | r8 | r0 | r10 |
| x8 | r6 | r2 |  | r7 | r0 | r9 | r8 | r1 | r11 |

XORbits → z0 (rows x0–x2)
XORbits → z1 (rows x3–x5)
XORbits → z2 (rows x6–x8)

Fig 10A       (xi AND yj) XOR r[i,j]

|   | y0 | y1 | y2 | y3 | y4 | y5 | y6 | y7 | y8 |
|---|---|---|---|---|---|---|---|---|---|
| x0 | r0 | r3 | r10 | r1 | r4 |  | r2 | r5 |  |
| x1 | r0 | r4 | r9 | r1 | r5 | r9 | r2 | r3 | r10 |
| x2 | r0 | r5 |  | r1 | r3 | r11 | r2 | r4 | r11 |
| x3 | r3 | r6 | r10 | r4 | r7 |  | r5 | r8 |  |
| x4 | r3 | r7 | r9 | r4 | r8 | r9 | r5 | r6 | r10 |
| x5 | r3 | r8 |  | r4 | r6 | r11 | r5 | r7 | r11 |
| x6 | r6 | r0 | r10 | r7 | r1 |  | r8 | r2 |  |
| x7 | r6 | r1 | r9 | r7 | r2 | r9 | r8 | r0 | r10 |
| x8 | r6 | r2 |  | r7 | r0 | r11 | r8 | r1 | r11 |

XORbits → z0 (rows x0–x2)
XORbits → z1 (rows x3–x5)
XORbits → z2 (rows x6–x8)

Fig 10B       (xi AND yj) XOR r[i,j]

|    | y0 | y1 | y2  | y3 | y4 | y5  | y6 | y7 | y8  |         |
|----|----|----|-----|----|----|-----|----|----|-----|---------|
| x0 | r0 | r3 | r10 | r1 | r4 | r13 | r2 | r5 |     | XORbits → z0 |
| x1 | r0 | r4 | r9  | r1 | r5 | r9  | r2 | r3 | r10 |         |
| x2 | r0 | r5 | r12 | r1 | r3 | r11 | r2 | r4 | r11 |         |
| x3 | r3 | r6 | r10 | r4 | r7 | r14 | r5 | r8 |     | XORbits → z1 |
| x4 | r3 | r7 | r9  | r4 | r8 | r9  | r5 | r6 | r10 |         |
| x5 | r3 | r8 | r12 | r4 | r6 | r11 | r5 | r7 | r11 |         |
| x6 | r6 | r0 | r10 | r7 | r1 | r14 | r8 | r2 |     | XORbits → z2 |
| x7 | r6 | r1 | r9  | r7 | r2 | r9  | r8 | r0 | r10 |         |
| x8 | r6 | r2 | r13 | r7 | r0 | r11 | r8 | r1 | r11 |         |

Fig 10C

|    | y0 | y1 | y2 |              |
|----|----|----|----|--------------|
| x0 | r0 | r4 | r0 | XORbits → z0 |
| x1 |    | r2 |    |              |
| x2 | r2 |    | r3 |              |
| x3 | r2 | r3 | r2 | XORbits → z1 |
| x4 |    | r1 |    |              |
| x5 | r1 |    | r5 |              |
| x6 | r1 | r5 | r1 | XORbits → z2 |
| x7 |    | r0 |    |              |
| x8 | r0 |    | r4 |              |

Fig 11

SIDE-CHANNEL ATTACK PROTECTED GATES HAVING LOW-LATENCY AND REDUCED COMPLEXITY

RELATED APPLICATION

This application is an international application of European Application No. 19199955.6, filed Sep. 26, 2019, which is incorporated by reference in its entirety.

FIELD

The present invention relates to secure digital circuits protected against side-channel attacks (SCA) using Boolean masking.

BACKGROUND

With Boolean masking, each binary variable input to a logic function of a digital circuit is divided into d+1 shares, where d is an integer at least equal to 1 designated as the "order of protection". The shares of a variable are randomly initialised such that XORing them together produces the original state of the variable.

Within a logic function, the shares may be processed according to various techniques that endeavour to prevent so-called "leakage" of the states of the variables from intermediate results. One such technique is called Domain-Oriented Masking (DOM), which has a relatively low complexity at the expense of an increased latency, see for instance ["Domain-Oriented Masking: Compact Masked Hardware Implementations with Arbitrary Protection Order", Hannes Gross et al., October 2016, The 2016 ACM Workshop]. Another technique is called Low-Latency Masking (LOLA), which has a low latency at the expense of an increased complexity, see for instance ["Generic Low-Latency Masking in Hardware", Hannes Gross et al., Transactions on Cryptographic Hardware and Embedded Systems, 2018].

It should be noted that the complexity and latency issues within the logic functions arise mainly through the use of non-linear gates, such as AND, NAND, OR and NOR gates. In contrast, linear gates, such as XOR gates, are well suited for leak-free designs.

Figure 1:
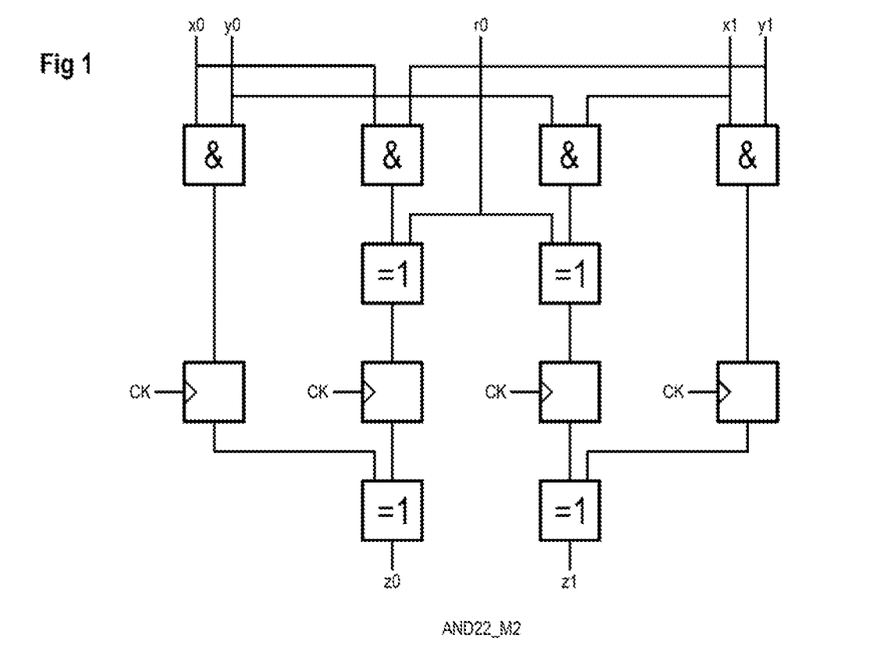
FIG. 1, previously described, is an example of a first-order masked AND gate implementing the DOM technique.

FIG. 1 illustrates an example of a first order masked AND gate implementing the DOM technique. This masked AND gate is designated by AND22_M2, where the first digits indicate the number of shares per input (here two shares for each of the two inputs), and the second digit is the number of shares the output is merged to (here two shares). The masked gate includes four elementary AND gates. The first elementary AND gate receives the first shares x0, y0 of the two input variables x and y, while the last elementary AND gate receives the second shares x1, y1 of the input variables. The two middle elementary AND gates respectively receive the pairs (x0, y1) and (x1, y0).

At the end, the outputs of the two first elementary AND gates are XORed to produce the first share z0 of the output variable z, and the outputs of the two remaining elementary AND gates are XORed to produce the second share z1 of the output variable z.

The fact that each of the output shares conveys both shares of one of the input variables, for instance y0 and y1 for z0, causes leakage of the state of that input variable. To avoid this, some of the intermediate results are "re-masked" with additional randomness. For instance, a same random bit r0 is XORed into the outputs of the two middle elementary AND gates. Each output share thus conveys a same random bit r0 that masks the states of the input variables. In the end, when the output shares are XORed to recover the state of the output, the random bit r0, present in both shares, is cancelled out.

The random bit r0 is generally provided by a random generator that produces a new random word (for instance a 32-bit word) every cycle of a clock CK. As a result, the four branches of the masked gate are synchronized to the clock CK by a layer of flip-flops before they are XORed to produce the output shares z0, z1. Hence, such a masked AND gate introduces a latency of one clock cycle.

Figure 2:
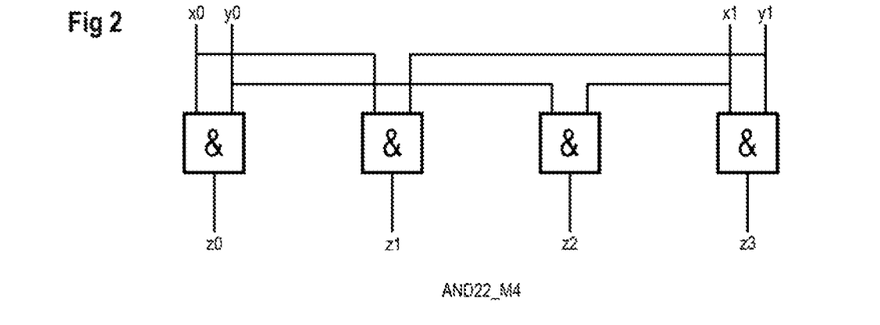
FIG. 2, previously described, is an example of a first-order masked AND gate implementing the LOLA technique.

FIG. 2 illustrates an example of a first order masked AND gate implementing the LOLA technique. This masked AND gate is designated by AND22_M4, where the first digits indicate the number of shares per input (here two shares for each of the two inputs), and the second digit is the number of shares the output is merged to (here four shares). The masked gate simply includes four elementary AND gates connected as in FIG. 1. The outputs of the elementary AND gates represent four shares z0-z3 of the output variable.

The state of the output variable is obtainable by XORing together the four shares z0-z3. No randomness is required, whereby no latency cycle is introduced. However, a subsequent layer of logic is designed to process four-share variables, increasing the complexity quadratically with the number of layers in the logic function.

One consequence of the AND function being non-linear is that the masked AND gate involves "domain crossings", i.e. the output share z0 belonging to domain 0 involves shares from domain 1, and reciprocally. In a first-order masked XOR gate, there are no domain crossings—the output shares z0 and z1 are simply x0⊕y0 and x1⊕y1.

SUMMARY

The present disclosure generally relates to a masked logic gate protected against side-channel attacks using Boolean masking with d+1 shares for each input variable, where d is an integer at least equal to 1 representing the protection order, the gate comprising a first input configured to receive a number of shares yj (j=0, 1, 2 . . . ); a second input configured to receive (d+1)2 shares xi (i=0, 1, 2 . . . ) representative of an intermediate result output by one layer of a tree of gates implementing low-latency masking with a protection order of d; and a (d+1)-share output obtained by applying a logic function of the masked gate to the shares of the first and second inputs using domain-oriented masking.

The first input may also be configured to receive (d+1)2 shares representative of an intermediate result output by one layer of a tree of gates implementing low-latency masking with a protection order of d.

The first input may instead be configured to receive d+1 shares of an input variable.

The masked gate may have a structure representable by a matrix having (d+1)2 rows assigned respectively to the shares xi of the second input, and a number of columns assigned respectively to the shares yj of the first input, the masked gate structure comprising, for each cell (i, j) of the matrix, an elementary gate of a same type connected to operate on the shares xi and yj; for each cell (i, j) in a subset of cells of the matrix, a random bit selected in a group of independent random bits, and an XOR gate connected to inject the random bit in the output of the corresponding elementary gate, wherein the random bits are selected such that any random bit occurs an even number of times in the matrix; and for each slice of d+1 rows of the matrix, a respective tree of XOR gates producing a corresponding output share of the masked gate from all the cells of the slice.

The XOR gates of the tree may be connected such that any XOR gate of the tree involves at least one random bit an odd number of times.

When d=2 and the first input is configured to receive 9 shares, the masked gate has three output shares corresponding respectively to three slices of the matrix, and the matrix has 9 rows and 9 columns. With the group of independent random bits including 12 random bits r0, r2 . . . r11, the random bits may be distributed as follows: a same random bit from the range r0-r8 occurs three times in each of two of the three slices and does not occur in the remaining slice; and a same random bit from the range r9-r11 occurs twice in each of the slices, but does not occur in the matrix an even number of times in a same column, nor in a same 3×3 square.

Each row of the matrix may further have a same number of random bits, while the random bits in each row are distinct.

When d=2 and the first input is configured to receive 3 shares, the masked gate has three output shares corresponding respectively to three slices of the matrix, and the matrix has 9 rows and 3 columns. With the group of independent random bits including 6 random bits r0, r2 . . . r5, the random bits may be distributed as follows: each random bit in the range r0-r2 occurs twice in each of two of the three slices and does not occur in the remaining slice; each random bit in the range r3-r5 occurs once in each of two of the three slices, and does not occur in the remaining slice; the pair of used random bits from the range r0-r2 is different in each slice; and the pair of used random bits from the range r3-r5 is different in each slice.

BRIEF DESCRIPTION OF DRAWINGS

Other advantages and features will become more clearly apparent from the following description of particular embodiments of the invention provided for exemplary purposes only and represented in the appended drawings, in which.

DESCRIPTION OF EMBODIMENTS

Figure 3:
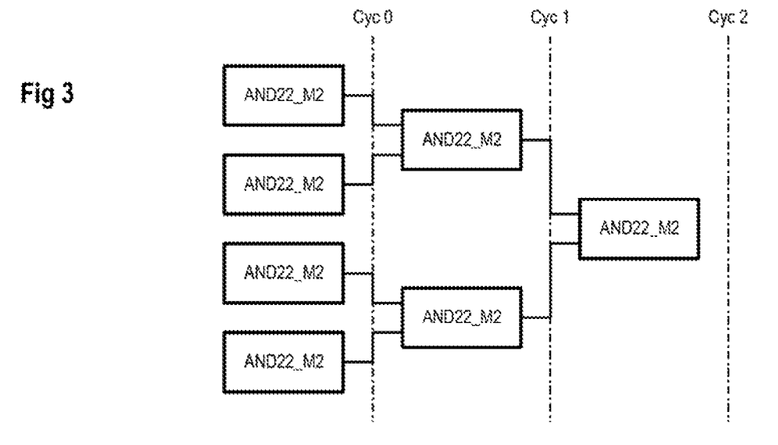
FIG. 3 is a block-diagram of an exemplary complex logic function with first-order masking, implemented using the DOM technique.

FIG. 3 is a block-diagram of an exemplary complex logic function with first-order Boolean masking, implemented using the DOM technique (Domain-Oriented Masking). The function, as an illustration, is an 8-input AND function. An 8-input AND function is traditionally implemented with eight elementary AND gates organized in a tree of three layers. With first-order masking and using the DOM technique, each of the elementary AND gates is replaced, as shown, with a masked AND gate of the type of FIG. 1, designated AND22_M2.

As mentioned earlier, with the DOM technique, each layer of masked AND gates introduces a delay of one clock cycle. Thus, the whole logic function introduces a delay of three clock cycles Cyc 0, Cyc 1, Cyc 2.

Figure 4:
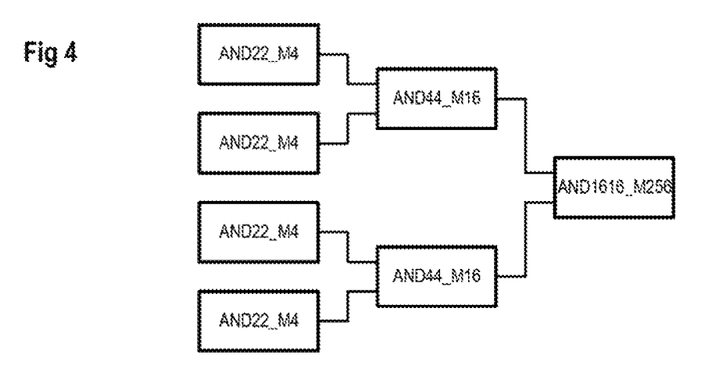
FIG. 4 is a block-diagram illustrating the same logic function as FIG. 3, implemented using the LOLA technique.

FIG. 4 also corresponds to an 8-input AND function with first-order masking, but implemented using the LOLA technique (LOw-LAtency masking). Each of the elementary AND gates of the first layer is replaced by a masked gate AND22_M4 of the type of FIG. 2. Each of these first-layer gates produces an output with 4 shares. The gates of the second layer, designated AND44_M16, each process two 4-share inputs and produce a 16-share output. Finally, the remaining gate in the last layer, designated AND1616_M256, processes two 16-share inputs and produces a 256-share output. To obtain the actual output state of the function, the 256 bits are XORed together.

The masked logic function thus implemented introduces no latency but the delay of the critical path, at the expense however of a gate count that increases quadratically with the number of layers of elementary gates needed for implementing the function.

In the present disclosure it is sought to mix the DOM and LOLA techniques to implement a complex logic function, while reducing the latency that would be required with a pure DOM implementation and reducing the complexity that would be required with a pure LOLA implementation.

To this end, it is devised that multiple layers in a tree of gates implementing a complex logic function alternatingly use the LOLA technique and the DOM technique, with a specific type of DOM gates configured to operate a quadratic share compression. For instance, for the first-order protection, the specific gates operate a 4:2 compression, and for the second-order protection, they operate a 9:3 compression.

Two types of compression gates may be provided for each protection order d, such as a symmetric gate denoted FN(d+1)2(d+1_d+1) having two (d+1)2-share inputs and a (d+1)-share output, and an asymmetric gate denoted FN(d+1)2(d+1_(d+1) having one (d+1)2-share input, one (d+1)-share input, and also a (d+1)-share output. "FN" designates the elementary logic function implemented, which shall hereinafter be illustrated as the AND function, which is the most common non-linear function used. These two types of compression gates are building blocks that allow the implementation of any complex logic function.

Figure 5A:
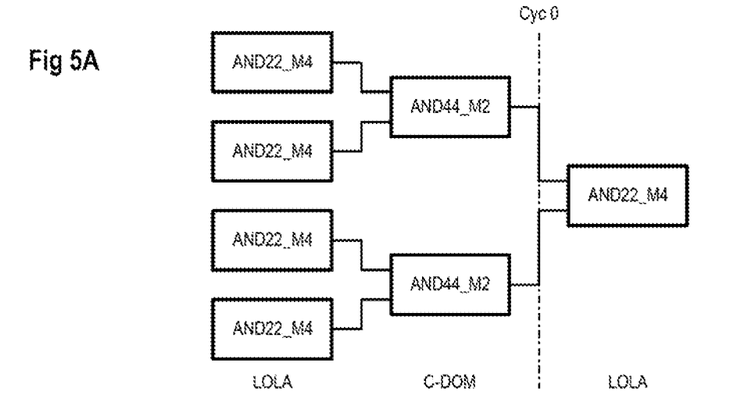
FIG. 5A is a block-diagram illustrating the same logic function as FIG. 3, implemented using a mix of the LOLA and DOM techniques, supported by masked gates achieving a 4:2 share-compression with the DOM technique.

FIG. 5A illustrates an application of this technique to the logic function of FIG. 3, with symmetric 4:2 compression gates denoted AND44_M2. The first layer includes four LOLA gates AND22_M4 of the type of FIG. 2, each producing an output with 4 shares. Thus, the compression gates AND44_M2 in the second layer (C-DOM) each process two 4-share inputs and produce a 2-share output. The remaining LOLA gate, in the last layer, designated AND22_M4, processes 2-share inputs and produces a 4-share output.

Compared to the pure DOM implementation of FIG. 3, the resulting logic function has a latency of only one cycle instead of three. Compared to the pure LOLA implementation of FIG. 4, the gate count increases linearly with the number of layers instead of quadratically, because the maximum share count can be limited to 4 for the LOLA gates.

Assuming the logic function requires another layer, the gate in the last layer would be a 4:2 compression gate that introduces an extra cycle of latency, but produces an output with only two shares.

The symmetric AND44_M2 compression gates are thus suitable for processing 4-share intermediate results. In a more general situation, some intermediate results will have 4 shares and others 2 shares, for instance because the number of inputs is not a power of 2, or because some inputs are processed by linear gates (that do not expand the number of shares).

Figure 5B:
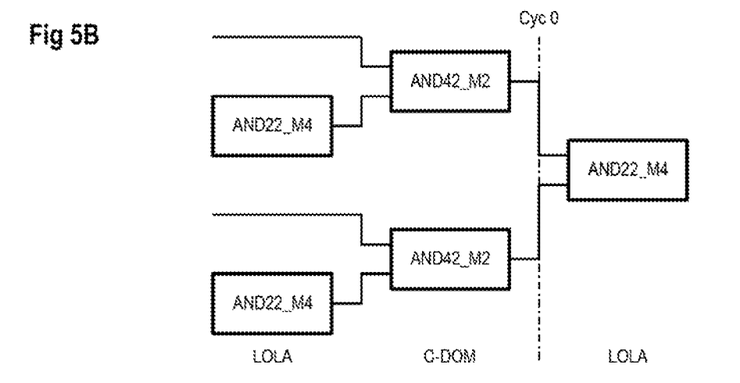
FIG. 5B is a block-diagram of an alternative logic function illustrating the use of alternative share-compression masked gates.

FIG. 5B illustrates an application of asymmetric compression gates for handling intermediate results with different numbers of shares, here the gates denoted AND42_M2. The function to implement is a 6-input AND function, each input having two shares. Four inputs are handled by a first layer of LOLA AND22_M4 gates, each producing a 4-share output. The asymmetric compression gates AND42_M2 each handle the 4-share output of an ANDM22_M4 gate, and one of the remaining 2-share inputs.

Figure 6:
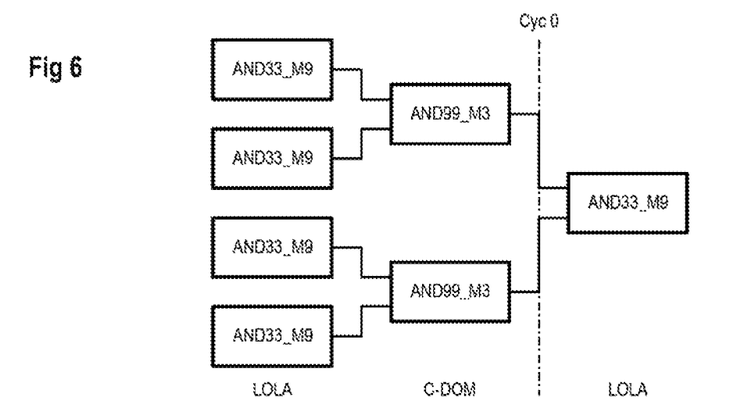
FIG. 6 is a block-diagram illustrating the logic function of FIG. 3 with second-order masking, implemented using a mix of the LOLA and DOM techniques, supported by masked gates achieving a 9:3 share-compression with the DOM technique.

FIG. 6 illustrates an application of 9:3 compression gates denoted AND99_M3 to an 8-input AND function with second-order protection. The first layer includes four LOLA gates AND33_M9, each producing an output with 9 shares. Thus, the compression gates AND99_M3 in the second layer each process two 9-share inputs and produce a 3-share output. The remaining LOLA gate, in the last layer, designated AND33_M9, processes 3-share inputs and produces a 9-share output.

Figure 7A:
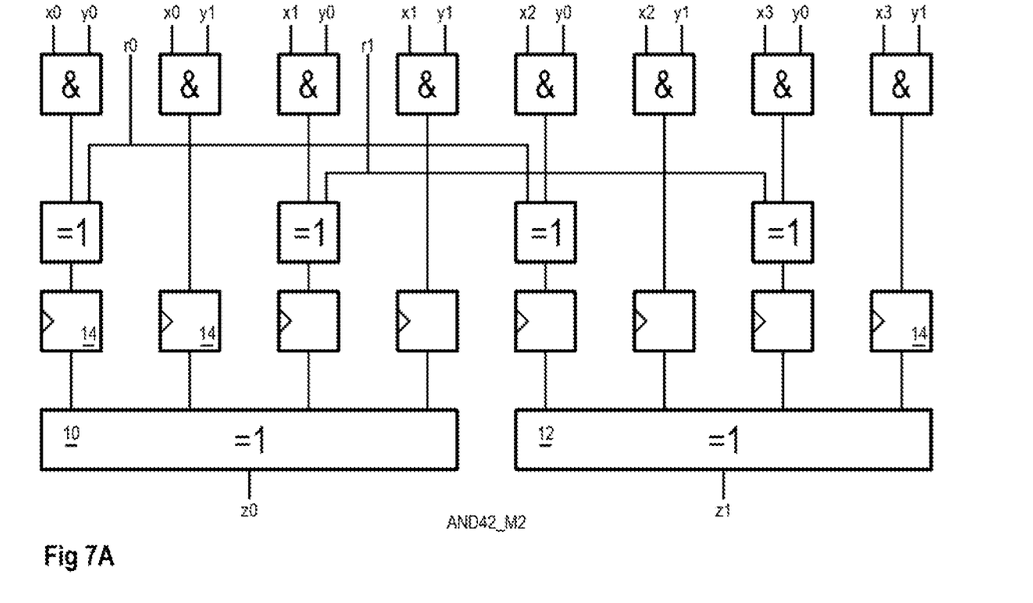
FIGS. 7A and 7B are circuit diagrams of two alternative examples of an asymmetric 4:2 share-compression masked gate.

FIG. 7A is a circuit diagram of an exemplary asymmetric 4:2 compression AND gate AND42_M2. The compression gate receives 4 shares x0-x3 of a variable x, and two shares y0, y1 of a variable y. In a first layer, 8 elementary AND gates respectively receive the share pairs (x0, y0), (x0, y1), (x1, y0), (x1, y1), (x2, y0), (x2, y1), (x3, y0), (x3, y1). The outputs of the first four elementary AND gates are XORed at 10 to produce the first share z0 of the output variable z. The outputs of the remaining four elementary AND gates are XORed at 12 to produce the second share z1 of the output variable z.

To avoid leaking states of input variables, two independent random values r0 and r1, for instance two bits taken from a word produced by a random generator, are used to re-mask intermediate results. The value r0 is injected in the outputs of the first and fifth elementary AND gates by respective XOR gates, while the value r1 is injected in the outputs of the third and seventh elementary AND gates. A layer of eight flip-flops 14 is provided to synchronize the eight branches to the clock of the random generator before the values conveyed in the branches are XORed at 10 and 12.

Each of boxes 10 and 12 may be a tree of elementary XOR gates. In principle, the XOR gates of each tree may be organized arbitrarily, i.e. a XOR gate of the first layer of the tree may receive the outputs of any two flip-flops 14. However, to further improve leakage prevention, the XOR gates are preferably organized so that each gate involves at least one of the random values r0, r1.

Figure 7B:
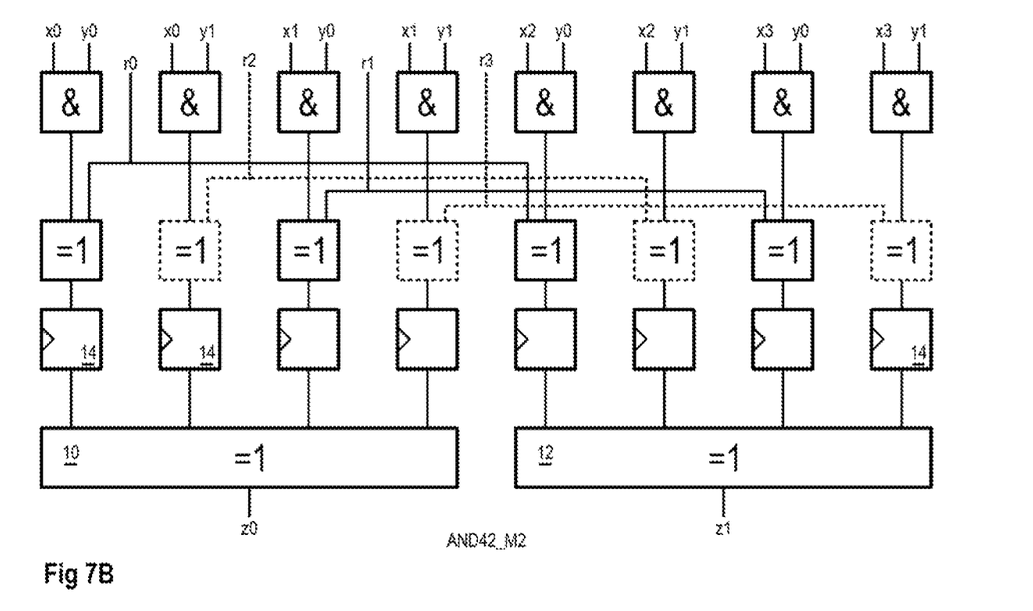

FIG. 7B is an alternative of the circuit of FIG. 7A offering increased protection against leakage. Two additional independent random values r2, r3 are used, for instance two further bits taken from the word produced by the random generator. The value r2 is injected in the outputs of the second and sixth elementary AND gates by respective XOR gates, while the value r3 is injected in the outputs of the fourth and eighth elementary AND gates.

Figure 8:
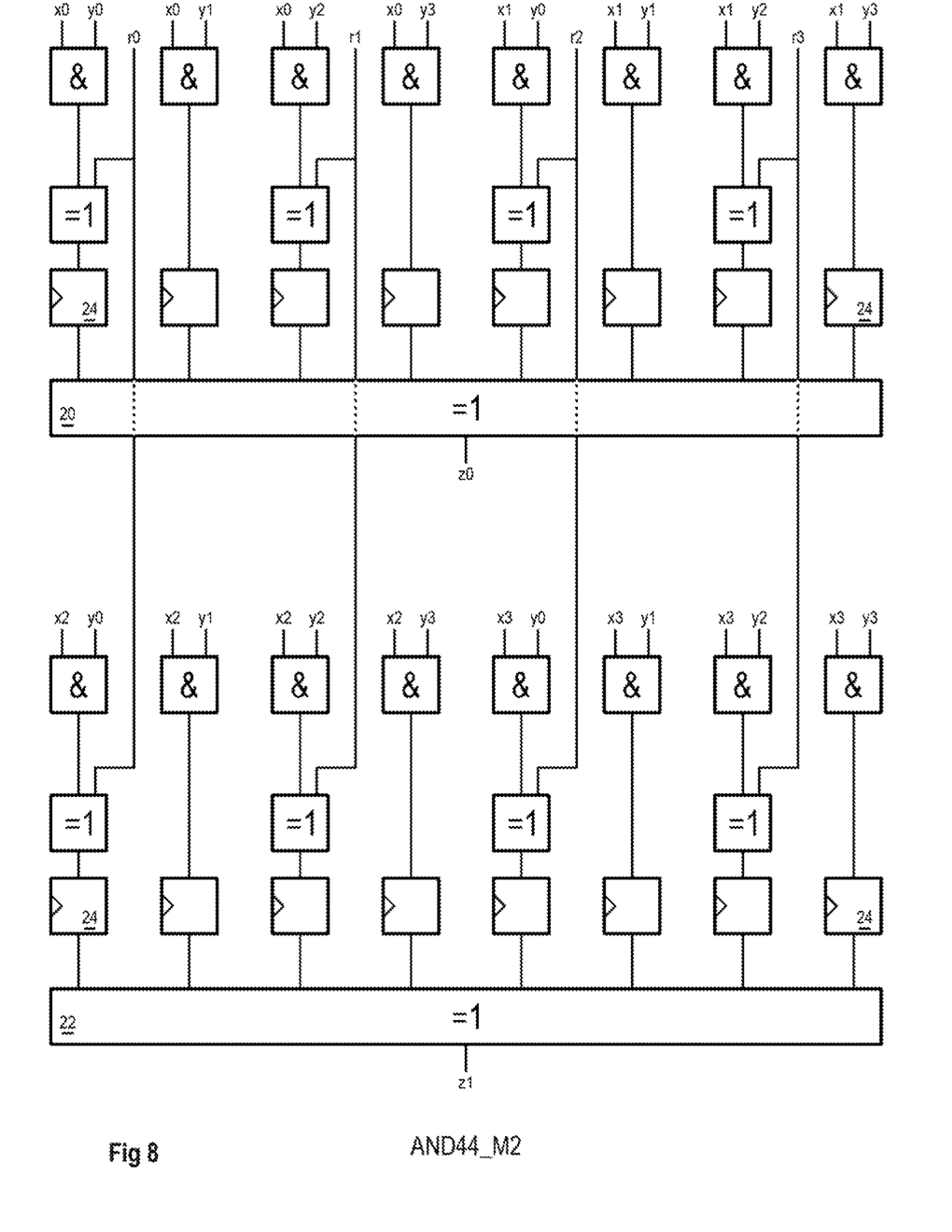
FIG. 8 is a circuit diagram of an exemplary symmetric 4:2 share-compression masked gate.

FIG. 8 is a circuit diagram of an exemplary symmetric 4:2 share compression AND gate AND44_M2. The compression gate receives 4 shares x0-x3 of a variable x, and four shares y0-y3 of a variable y. A first layer of sixteen elementary AND gates, shown in two sets of eight, receive the respective share pairs (x0, y0), (x0, y1), (x0, y2), (x0, y3), (x1, y0), (x1, y1), (x1, y2), (x1, y3), and (x2, y0), (x2, y1), (x2, y2), (x2, y3), (x3, y0), (x3, y1), (x3, y2), (x3, y3). The outputs of the first set of elementary AND gates are XORed at 20 to produce the first share z0 of the output variable z. The outputs of the second set of elementary AND gates are XORed at 22 to produce the second share z1 of the output variable z.

To avoid leaking states of input variables, four independent random values r0-r3, produced by a random generator, are used to re-mask intermediate results. The value r0 is XORed into the output of the first elementary AND gate of each set. The value r1 is XORed into the output of the third elementary AND gate of each set. The value r2 is XORed into the output of the fifth elementary AND gate of each set. Finally, the value r3 is XORed into the output of the seventh elementary AND gate of each set.

The random values are shown as applied to every odd gate of each set. In an alternative, they could be applied to every even gate of each set. In another alternative, each random value is applied to an odd number of gates of each set, for instance three gates, meaning that multiple random values may be applied to some gates.

A layer of sixteen flip-flops 24 is provided to synchronize the sixteen branches to the clock of the random generator before the values conveyed in the branches are XORed at 20 and 22.

Each of boxes 20 and 22 may be a tree of elementary XOR gates. The XOR gates are preferably organized so that each XOR gate involves at least one of the random values r0-r3. As a general rule applicable to any embodiment, the XOR gates of the tree are connected such that any XOR gate of the tree involves at least one random value an odd number of times. Indeed, in more complex embodiments presented hereinafter, some random values may be involved twice or an even number of times in branches upstream the XOR gate, whereby these random values would be cancelled out.

Figure 9:
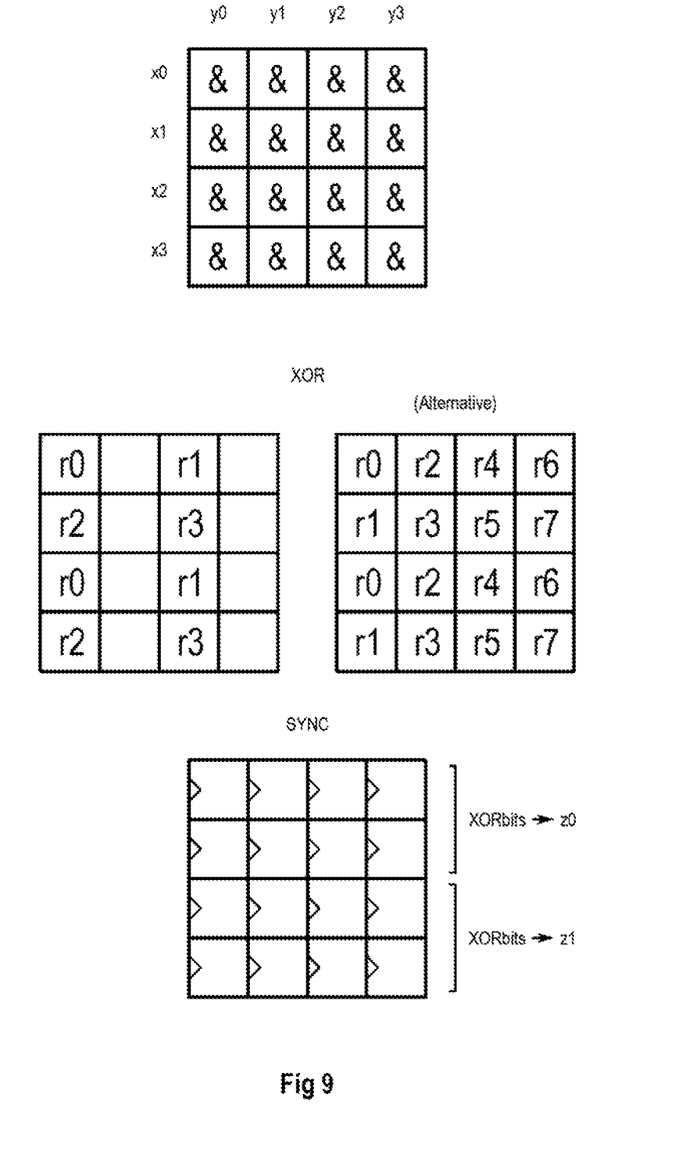
FIG. 9 is an alternative representation, in matrix form, of the symmetric masked compression gate of FIG. 8.

FIG. 9 is an alternative representation, in matrix form, of the symmetric masked compression gate of FIG. 8. A 4×4 matrix shown at the top illustrates the first layer of elementary AND gates and the inputs. Each row of the matrix is assigned to a respective share x0-x3 of input variable x. Each column of the matrix is assigned to a respective share y0-y3 of the input variable y. A matrix cell (i, j) thus corresponds to an elementary AND gate receiving shares xi and yj.

Two 4×4 matrices shown in the middle illustrate two alternative examples for re-masking intermediate results using random values. A matrix cell (i, j) corresponds here to XORing the value present in the cell, denoted r[i, j], with the corresponding cell of the top matrix, yielding (xi & yj) r[i, j], where r[i, j] is void or one of the random values r0, r1 . . . . When r[i, j] is void, no XOR operation is performed, i.e. the cell represents a direct connection. The left matrix corresponds to the circuit of FIG. 8, using four independent random values r0-r3. The right matrix corresponds to an alternative offering improved leakage prevention in some conditions, using eight independent random values r0-r7.

The bottom 4×4 matrix illustrates the synchronization and the XOR operations for producing the output shares z0, z1. Each output share is produced by XORing the resulting bits of a respective 2-row slice of the matrix.

The final compression gate structure is thus obtained by superimposing the top matrix, one of the middle matrices, and the bottom matrix. In fact, the most variable feature of the compression gates is the distribution of the random values, i.e. the middle matrix. Hence, the full circuit structure may be represented by just the middle matrix, as will be done hereinafter.

It may be noted that the asymmetric compression gate structures of FIGS. 7A, 7B may be represented by the two first columns or the two last columns of the matrices of FIG. 9.

Figure 10A:
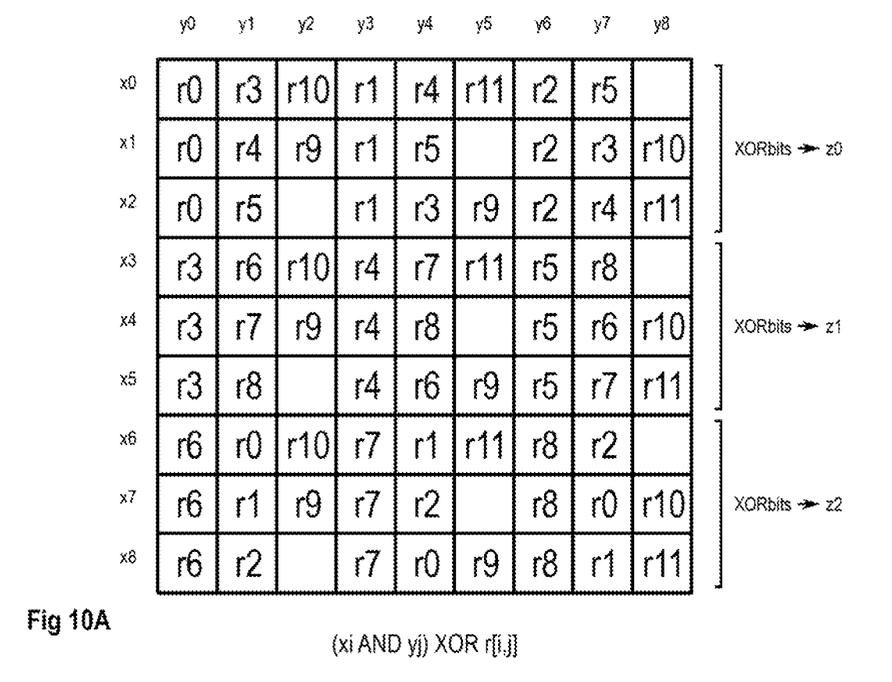
FIGS. 10A, 10B, 10C are diagrams, in matrix form, of alternative examples of a symmetric 9:3 share-compression masked gate.
Figure 10B:
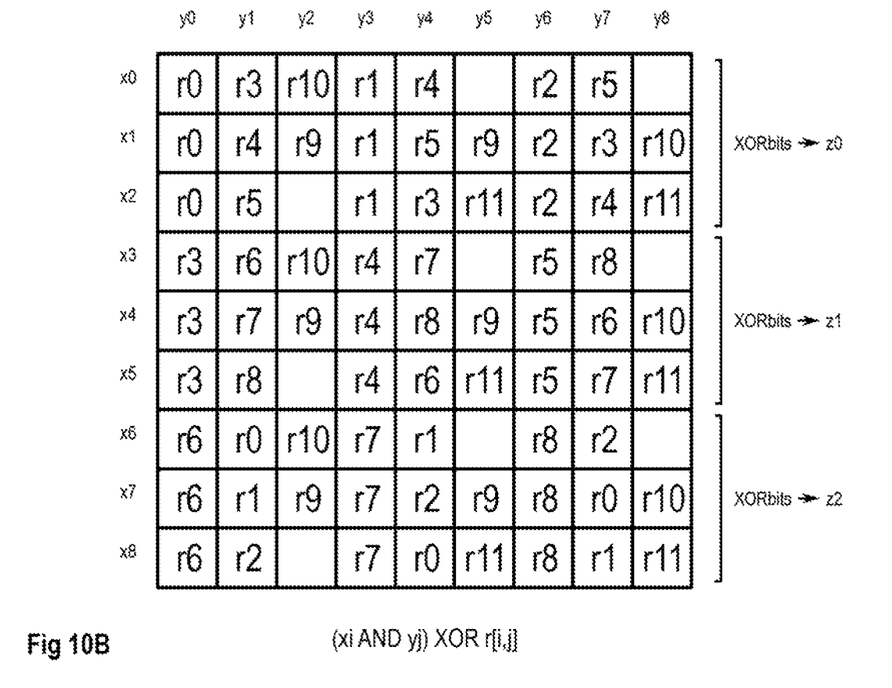
Figure 10C:
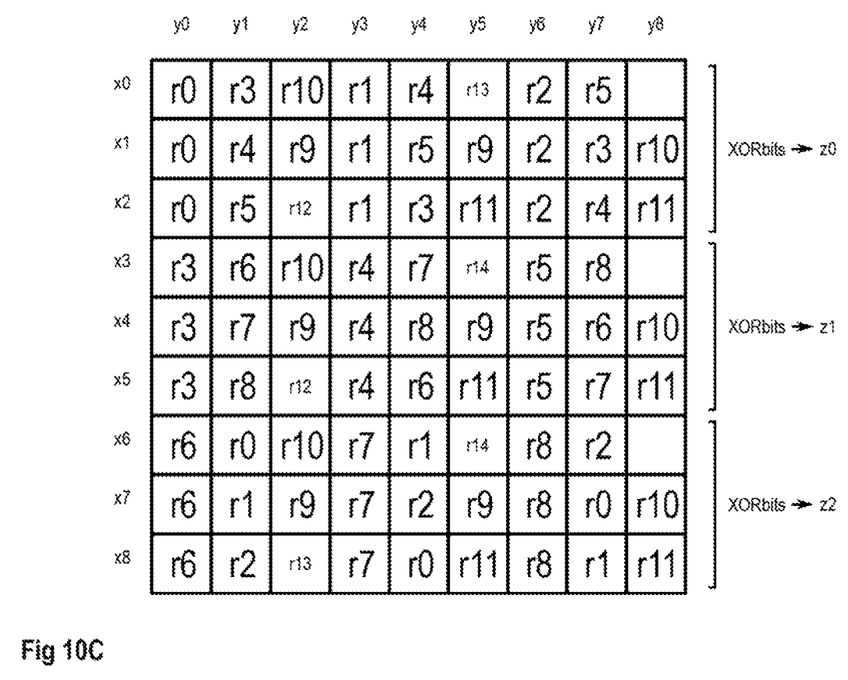

FIGS. 10A, 10B, 10C are diagrams, in simplified matrix form, of alternative examples of a symmetric 9:3 share compression masked gate. Each input x, y has nine shares x0-x8, y0-y8. The shares x0-x8 are applied to the rows of 9×9 matrices, while the shares y0-y8 are applied to the columns. Each matrix cell (i, j) is thus designed to perform the operation (xi & yj) r[i,j], where r[i, j], like before, is void or a random value taken among the bits of a word produced by a random generator. Each of the three output shares z0-z3 of the output variable z is produced by XORing the resulting bits of a respective three-row slice of the matrix. For instance, the first slice including the three top rows produces the share z0; the second slice including the three middle rows produces the share z1; and the third slice including the three bottom rows produces the share z2.

As mentioned before, to improve leakage prevention, each output share may be produced from the corresponding slice by a respective tree of XOR gates connected such that any XOR gate of the tree involves at least one random value an odd number of times.

FIG. 10A illustrates a first example of distribution of random values that offers effective protection against leakage of states of input variables in intermediate results. The random values are selected from twelve independent random bits r0-r11. The following set of constraints may be used for finding an appropriate distribution of the random values in the matrix:

1) Each random bit occurs an even number of times in the matrix;
2) A same random bit from the range r0-r8 occurs three times in each of two of the three slices and does not occur in the remaining slice; and
3) A same random bit from the range r9-r11 occurs twice in each of the slices, but does not occur in the matrix an even number of times in a same column, nor in a same 3×3 square.

Constraint (1) is applicable in general to all structures.

In FIG. 10A, a further set of constraints is used, where:
4) Each row of the matrix has a same number of random values; and
5) The random values in each row are distinct.

As an exemplary result of these constraints, as shown, each slice k (k=0, 1, 2) has:

Value r(3k) repeated in the cells of column 0, value r(3k+1) repeated in the cells of column 3, and value r(3k+2) repeated in the cells of column 6;

A different arrangement of values r(3k+3), r(3k+4), r(3k+5) in each of columns 1, 4 and 7, where (3k+3), (3k+4), (3k+5) are expressed modulo 9; and Values r10, r9 in the two first cells of column 2, values r11, r9 in the first and last cells of column 5, and values r10, r11 in the two last cells of column 8.

The listed constraints allow numerous other distributions of the random values that offer the desired degree of protection. For instance, the slices may be shuffled, and the rows within any slice may be shuffled. Similar shuffling may be applied by columns, when splitting the matrix in three groups of three consecutive columns.

It should however be noted that the listed constraints, especially the second set (4), (5), are sufficient but not necessary, i.e. distributions that do not fulfil these constraints may also offer the desired degree of protection. Hence, the disclosed constraints may be used by those skilled in the art as a guidance to readily find appropriate random value distributions, but other appropriate distributions may be found using trial and error.

FIG. 10B, for instance, shows an alternative distribution of the random values that does not fulfil the second set of constraints, but that nevertheless offers the same degree of protection. Compared to FIG. 10A, in column 5 of the slices, the values r9 and r11 have been placed respectively in the first and third cells.

FIG. 10C shows the distribution of random values of FIG. 10B, with an exemplary distribution of three additional random values r12-r14, offering improved leakage prevention in some conditions. The additional random values, shown smaller, are distributed among the void cells of FIG. 10B so that each value is used an even number of times in the matrix (here twice), and that each value is used an odd number of times in each slice (here once).

Figure 11:
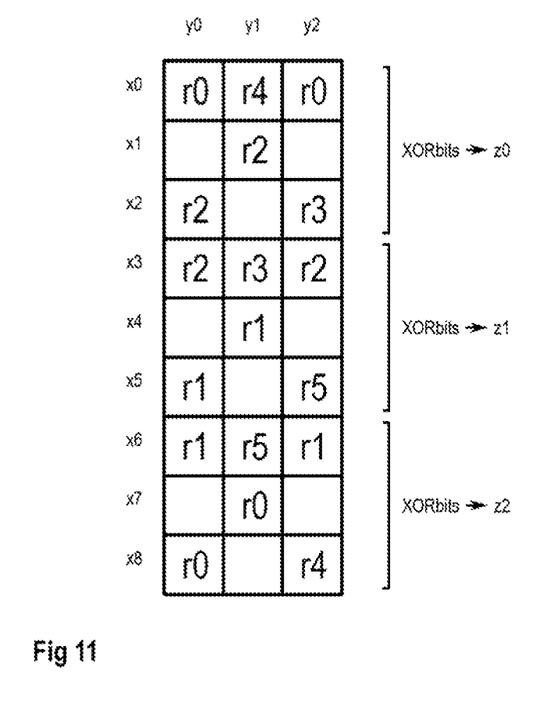
FIG. 11 is a diagram, in matrix form, of an exemplary asymmetric 9:3 share-compression masked gate.

FIG. 11 is a diagram, in matrix form, of an exemplary asymmetric 9:3 share-compression masked gate. Actually, unlike the derivation of an asymmetric 4:2 compression gate structure from a symmetric 4:2 compression gate structure, an asymmetric 9:3 compression gate structure is not trivially derivable from a symmetric 9:3 compression gate structure.

The structure of FIG. 11 uses six independent random bits r0-r5. Each random bit in the range r0-r2 occurs twice in two of the three slices and does not occur in the remaining slice. Each bit in the range r3-r5 occurs once in two of the three slices, and does not occur in the remaining slice. The pair of bits from the range r0-r2 is different in each slice, and so is the pair of bits from the range r3-r5.

One bit from the range r0-r2 is placed in the first and last cells of the first row of a slice, while the other bit from the range r0-r2 is placed in the middle cell of the middle row of the slice and in the first cell of the last row of the slice.

Finally, one bit of the range r3-r5 is placed in the middle cell of the first row of a slice, and the other bit from the range r3-r5 is placed in the last cell of the last row of the slice.

Like for the 9:3 symmetric compression structure, the slices may be shuffled and the rows in the slices may be shuffled. The columns may also be shuffled.

Many variations of the above-described embodiments will be apparent to those skilled in the art. Although the compression masked gates have essentially been described as AND gates, they may implement any other non-linear function, such as NAND, OR, or NOR by replacing the elementary AND gates by elementary gates performing the desired logic function.

What is claimed is:

1. A masked logic gate protected against side-channel attacks using Boolean masking with d+1 shares for each input variable, where d is an integer at least equal to 1 representing a protection order, the masked logic gate comprising:
   a first input configured to receive a number of shares yj (j=0, 1, 2 . . . );
   a second input configured to receive $(d+1)^2$ shares xi (i=0, 1, 2 . . . ) representative of an intermediate result output by one layer of a tree of gates implementing low-latency masking with the protection order of d; and
   a (d+1)-share output obtained by applying a logic function of the masked logic gate to the shares of the first and second inputs using domain-oriented masking.

2. The masked logic gate of claim 1, wherein the first input is also configured to receive $(d+1)^2$ shares representative of an intermediate result output by one layer of a tree of gates implementing low-latency masking with the protection order of d.

3. The masked logic gate of claim 1, wherein the first input is configured to receive d+1 shares of an input variable.

4. The masked logic gate of claim 1, having a structure representable by a matrix having $(d+1)^2$ rows assigned respectively to the shares xi of the second input, and a number of columns assigned respectively to the shares yj of the first input, the structure comprising:
   for each cell (i, j) of the matrix, an elementary gate of a same type connected to operate on the shares xi and yj;
   for each cell (i, j) in a subset of cells of the matrix, a random bit selected in a group of independent random bits (r0, r1, r2 . . . ), and an XOR gate connected to inject the random bit in the output of the corresponding elementary gate, wherein the random bits are selected such that any random bit occurs an even number of times in the matrix; and
   for each slice of d+1 rows of the matrix, a respective tree of XOR gates producing a corresponding output share (z0, z1, z2) of the masked logic gate from all the cells of the slice.

5. The masked logic gate of claim 4, wherein the XOR gates of the tree are connected such that any XOR gate of the tree receives at least one random bit an odd number of times.

6. The masked logic gate of claim 4, where d=2 and the first input is configured to receive 9 shares, wherein the masked logic gate has three output shares (z0, z1, z2) corresponding respectively to three slices of the matrix, and the matrix has 9 rows and 9 columns, and wherein:
   the group of independent random bits includes 12 random bits r0, r2 . . . r11;
   a same random bit from the range r0-r8 occurs three times in each of two of the three slices and does not occur in the remaining slice; and
   a same random bit from the range r9-r11 occurs twice in each of the slices, but does not occur in the matrix an even number of times in a same column, nor in a same 3×3 square.

7. The masked logic gate of claim 6, wherein:
   each row of the matrix has a same number of random bits; and
   the random bits in each row are distinct.

8. The masked logic gate of claim 4, where d=2 and the first input is configured to receive 3 shares, wherein the masked logic gate has three output shares (z0, z1, z2) corresponding respectively to three slices of the matrix, and the matrix has 9 rows and 3 columns, and wherein:
   the group of independent random bits includes 6 random bits r0, r2 . . . r5;
   each random bit in the range r0-r2 occurs twice in each of two of the three slices and does not occur in the remaining slice;
   each random bit in the range r3-r5 occurs once in each of two of the three slices, and does not occur in the remaining slice;
   the pair of used random bits from the range r0-r2 is different in each slice; and
   the pair of used random bits from the range r3-r5 is different in each slice.

9. A masked logic gate comprising:
   a first input configured to receive a number of shares yj (j=0, 1, 2 . . . );
   a second input configured to receive $(d+1)^2$ shares xi (i=0, 1, 2 . . . ) representative of an intermediate result output by one layer of a tree of gates implementing low-latency masking with a protection order of d, where d is an integer at least equal to 1 representing the protection order; and
   a (d+1)-share output obtained by applying a logic function of the masked logic gate to the shares of the first and second inputs using domain-oriented masking.

10. The masked logic gate of claim 9, wherein the first input is also configured to receive $(d+1)^2$ shares representative of an intermediate result output by one layer of a tree of gates implementing low-latency masking with the protection order of d.

11. The masked logic gate of claim 9, wherein the first input is configured to receive d+1 shares of an input variable.

12. The masked logic gate of claim 9, having a structure representable by a matrix having $(d+1)^2$ rows assigned respectively to the shares xi of the second input, and a number of columns assigned respectively to the shares yj of the first input, the structure comprising:
   for each cell (i, j) of the matrix, an elementary gate of a same type connected to operate on the shares xi and yj;
   for each cell (i, j) in a subset of cells of the matrix, a random bit selected in a group of independent random bits (r0, r1, r2 . . . ), and an XOR gate connected to inject the random bit in the output of the corresponding elementary gate, wherein the random bits are selected such that any random bit occurs an even number of times in the matrix; and
   for each slice of d+1 rows of the matrix, a respective tree of XOR gates producing a corresponding output share (z0, z1, z2) of the masked logic gate from all the cells of the slice.

13. The masked logic gate of claim 12, wherein the XOR gates of the tree are connected such that any XOR gate of the tree receives at least one random bit an odd number of times.

14. The masked logic gate of claim 12, where d=2 and the first input is configured to receive 9 shares, wherein the masked logic gate has three output shares (z0, z1, z2) corresponding respectively to three slices of the matrix, and the matrix has 9 rows and 9 columns, and wherein:
   the group of independent random bits includes 12 random bits r0, r2 . . . r11;
   a same random bit from the range r0-r8 occurs three times in each of two of the three slices and does not occur in the remaining slice; and
   a same random bit from the range r9-r11 occurs twice in each of the slices, but does not occur in the matrix an even number of times in a same column, nor in a same 3×3 square.

15. The masked logic gate of claim 14, wherein:
each row of the matrix has a same number of random bits; and
the random bits in each row are distinct.

16. The masked logic gate of claim 12, wherein d=2 and the first input is configured to receive 3 shares, wherein the masked logic gate has three output shares (z0, z1, z2) corresponding respectively to three slices of the matrix, and the matrix has 9 rows and 3 columns, and wherein:
the group of independent random bits includes 6 random bits r0, r2 . . . r5;
each random bit in the range r0-r2 occurs twice in each of two of the three slices and does not occur in the remaining slice;
each random bit in the range r3-r5 occurs once in each of two of the three slices, and does not occur in the remaining slice;
the pair of used random bits from the range r0-r2 is different in each slice; and
the pair of used random bits from the range r3-r5 is different in each slice.

\* \* \* \* \*

UNITED STATES PATENT AND TRADEMARK OFFICE
CERTIFICATE OF CORRECTION

| | | |
|---|---|---|
| PATENT NO. | : 11,500,986 B2 | |
| APPLICATION NO. | : 17/028831 | |
| DATED | : November 15, 2022 | |
| INVENTOR(S) | : Simon Hoerder | |

It is certified that error appears in the above-identified patent and that said Letters Patent is hereby corrected as shown below:

On the Title Page

Item (30), delete "19199955" and insert -- 19199955.6 --

Signed and Sealed this
Third Day of January, 2023

Katherine Kelly Vidal
Director of the United States Patent and Trademark Office